W. & W. H. Lewis,

Shoe Heel,

Nº 1,391.    Patented Oct. 31, 1839.

UNITED STATES PATENT OFFICE.

WM. LEWIS AND WM. H. LEWIS, OF NEW YORK, N. Y.

HEEL-PLATE FOR BOOTS AND SHOES.

Specification of Letters Patent No. 1,391, dated October 31, 1839.

*To all whom it may concern:*

Be it known that we, WILLIAM LEWIS and WILLIAM HENRY LEWIS, both of the city and State of New York, have invented a new and useful Improvement in the Construction of Heel-Plates for Boots or Shoes.

The nature of our invention consists in the combination of a plate of metal or composition with the plate such as is usually worn on boots or shoes for the purpose of forming a foundation to the outer or wearing plate; also in the method of holding the leather or other material which the outside plate is filled in with by means of undercut edges in the recess on the outer or wearing plate.

Figure 1:
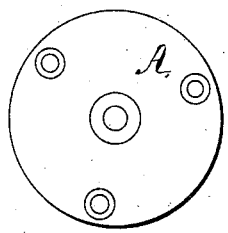
Figure 3:
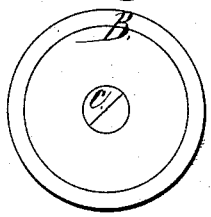
Figure 2:
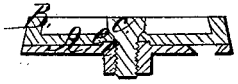

The method of constructing our improved plate, is thus, provided plates of metal or composition as described in the drawings to which this specification refers and marked A, Figures 1, and 2. The surfaces of plates A, and B, Fig. 2, which come in contact with each other must be turned true. A sinking may be formed in one of these plates with a corresponding projection on the other, as those marked $e$, $e$, in section Fig. 2; make 3 or more holes in plate A, for screws to pass through to fasten plate A, on the boot or shoe; also make a hole in the center of plate A, and tap the hole to receive the screw, $c$, Figs. 2 and 3. Around the outer surface of the plate, B, Figs. 2 and 3, there is a raised rim to receive the leather or other material which the plate B, is filled in with. The outside edge of the filling in is confined by the under cut, as shown in section Fig. 2, and the center of the filling in is held by the countersunk head of the screw, $c$, Figs. 2, and 3.

The method of using our improvement is this, when the outer plate wears away on one part of its circumference slack the screw in the center, then shift the outside plate as much as necessary, then tighten the screw; this do until the outside plate is worn out, when it may be replaced with a new one.

What we claim as our invention and desire to secure by Letters Patent is—

The construction and combination of the plates, A, and, B, as above described.

WILLIAM LEWIS.
WILLIAM HENRY LEWIS.

Witnesses:
RICHARD ALFRED LEWIS,
JOHN A. DRUMMOND.